US006901201B2

United States Patent
Gurusamy et al.

(10) Patent No.: US 6,901,201 B2
(45) Date of Patent: May 31, 2005

(54) FIBER-FLEXURE-SUBSTRATE PRODUCTION TRAY

(75) Inventors: Jayakumar Gurusamy, Newark, CA (US); Marc Epitaux, Sunnyvale, CA (US); Ken Fukui, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 10/113,552

(22) Filed: Mar. 29, 2002

(65) Prior Publication Data

US 2003/0185538 A1 Oct. 2, 2003

(51) Int. Cl.[7] ................................................. G02B 6/00
(52) U.S. Cl. ...................................... 385/135; 385/134
(58) Field of Search ............................... 385/134, 135, 385/136, 137, 88, 89, 147

(56) References Cited

U.S. PATENT DOCUMENTS

| | | | | |
|---|---|---|---|---|
| 4,944,569 A | * | 7/1990 | Boudreau et al. .............. 385/95 |
| 5,361,318 A | * | 11/1994 | Go et al. ....................... 385/88 |
| 5,684,902 A | * | 11/1997 | Tada ........................... 385/88 |
| 5,745,624 A | * | 4/1998 | Chan et al. .................... 385/91 |
| 5,909,523 A | * | 6/1999 | Sakaino et al. ................ 385/49 |
| 6,085,003 A | * | 7/2000 | Knight ......................... 385/59 |
| 6,239,427 B1 | * | 5/2001 | Mizue ......................... 250/239 |
| 6,434,314 B1 | * | 8/2002 | Gatica et al. ................ 385/136 |
| 6,516,130 B1 | * | 2/2003 | Jang ............................ 385/136 |
| 6,522,486 B2 | * | 2/2003 | Furuhashi et al. .......... 359/819 |
| 6,628,881 B2 | * | 9/2003 | Epitaux ....................... 385/137 |
| 2003/0118293 A1 | * | 6/2003 | Canace et al. ................ 385/92 |

* cited by examiner

Primary Examiner—Edward J. Glick
Assistant Examiner—Chih-Cheng Glen Kao
(74) Attorney, Agent, or Firm—Michael D. Plimier (57) ABSTRACT

A fiber-flexure-substrate tray for transporting and protecting optical modules and optical module components. The fiber-flexture substrate tray may have a tray body for supporting an optical fiber and other components coupled to the optical fiber while the optical fiber and the other components are processed. In addition, the fiber-flexure-substrate tray may have a thermally conductive substrate holder coupled to the tray body for heat-treating other components coupled to the optical fiber. The tray body may have a support area designed to hold the optical fiber off of the thermally conductive substrate holder to thermally isolate the optical fiber. In addition, a component may be coupled to the tray to hold the optical fiber off of the thermally conductive substrate holder.

32 Claims, 10 Drawing Sheets

FIBER-FLEXURE-SUBSTRATE PRODUCTION TRAY

FIELD OF THE INVENTION

An embodiment of the invention relates to optical module production. In particular, an embodiment of the invention relates to a production tray for substrates and optical fibers.

BACKGROUND OF THE RELATED ART

Optical modules, such as but not limited to transmitters and receivers, comprised of substrates and optical fibers are used in many applications including but not limited to data routers. When making optical modules, an optical fiber coupled to a flexure may be aligned and welded to a substrate having a diode. Typically, a fiber clamp is coupled to the optical fiber when moving the optical fiber and flexure into a welding station. The optical fiber and flexure are then released from the fiber clamp to be manipulated by a device holding the flexure. The optical fiber and flexure are then aligned to a substrate and then the flexure may be welded to the substrate.

Following alignment, the substrate, flexure, and optical fiber may be carried to a heat-treating station to relieve stresses in the weld between the substrate and flexure. The optical fibers need to be carried individually between processing stations and individually aligned to each processing station. However, individually carrying and aligning each optical fiber is expensive and time consuming.

BRIEF DESCRIPTION OF THE DRAWINGS

The present invention is illustrated by way of example and not limitation in the accompanying figures.

DETAILED DESCRIPTION OF THE INVENTION

In the following description, numerous specific details are set forth. However, it is understood that embodiments of the invention may be practiced without these specific details. In other instances, well-known details, such as particular materials or methods, have not been shown in detail in order not to obscure the understanding of this description.

Figure 1:
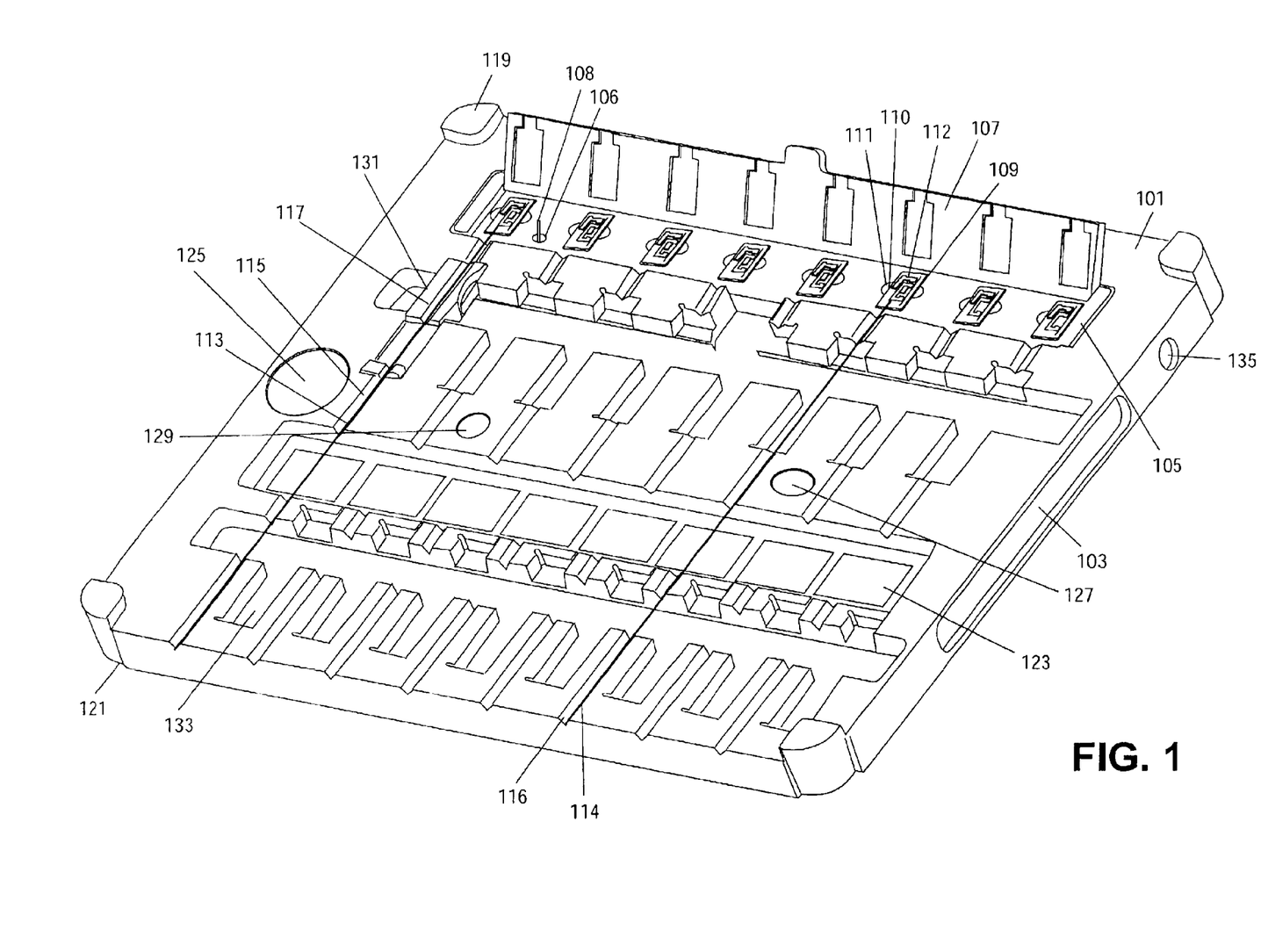
FIG. 1 shows an embodiment of the invention of the fiber-flexure-substrate tray.
Figure 2:
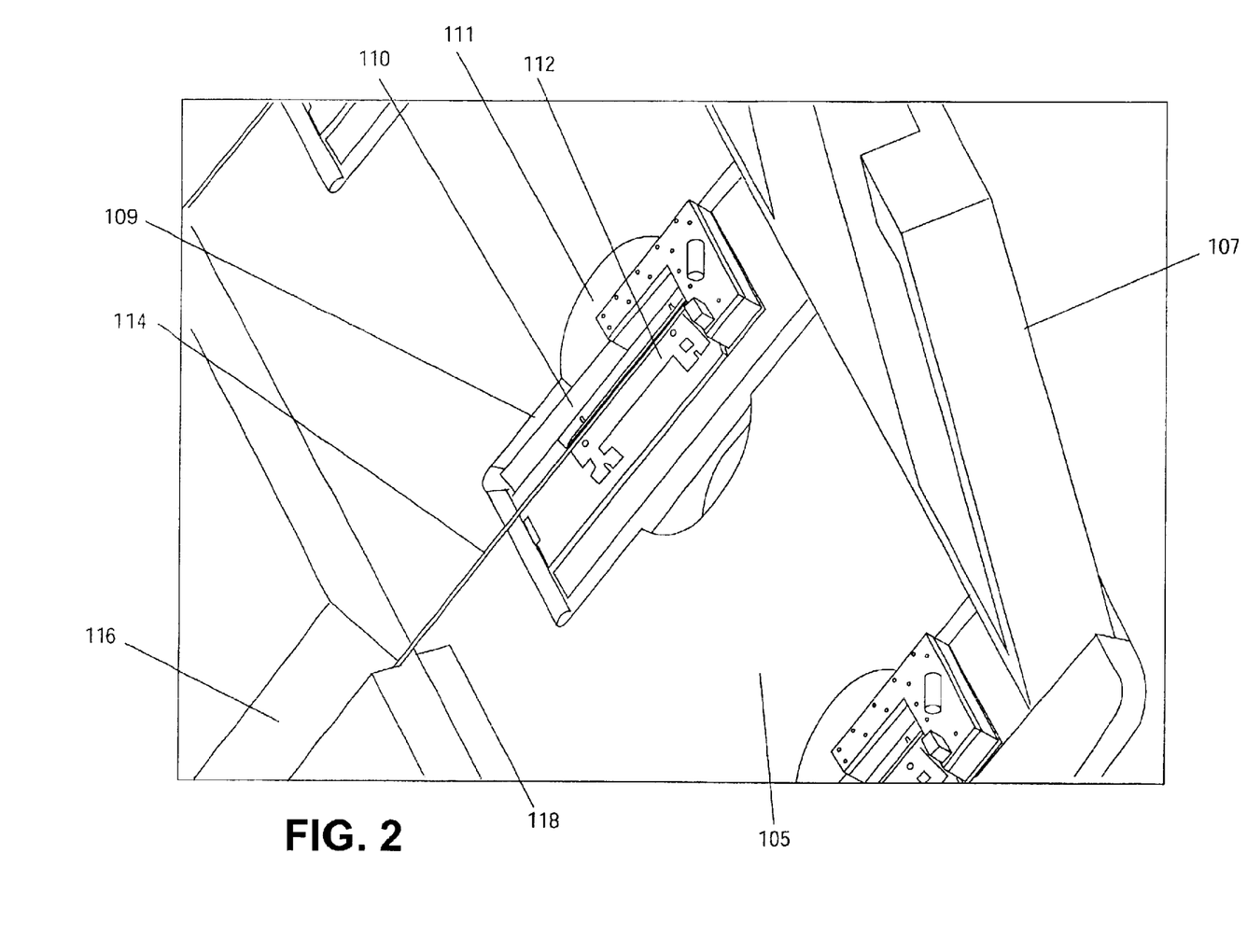
FIG. 2 shows an embodiment of the invention with a lip on a tray body for insulating an optical fiber.
Figure 3:
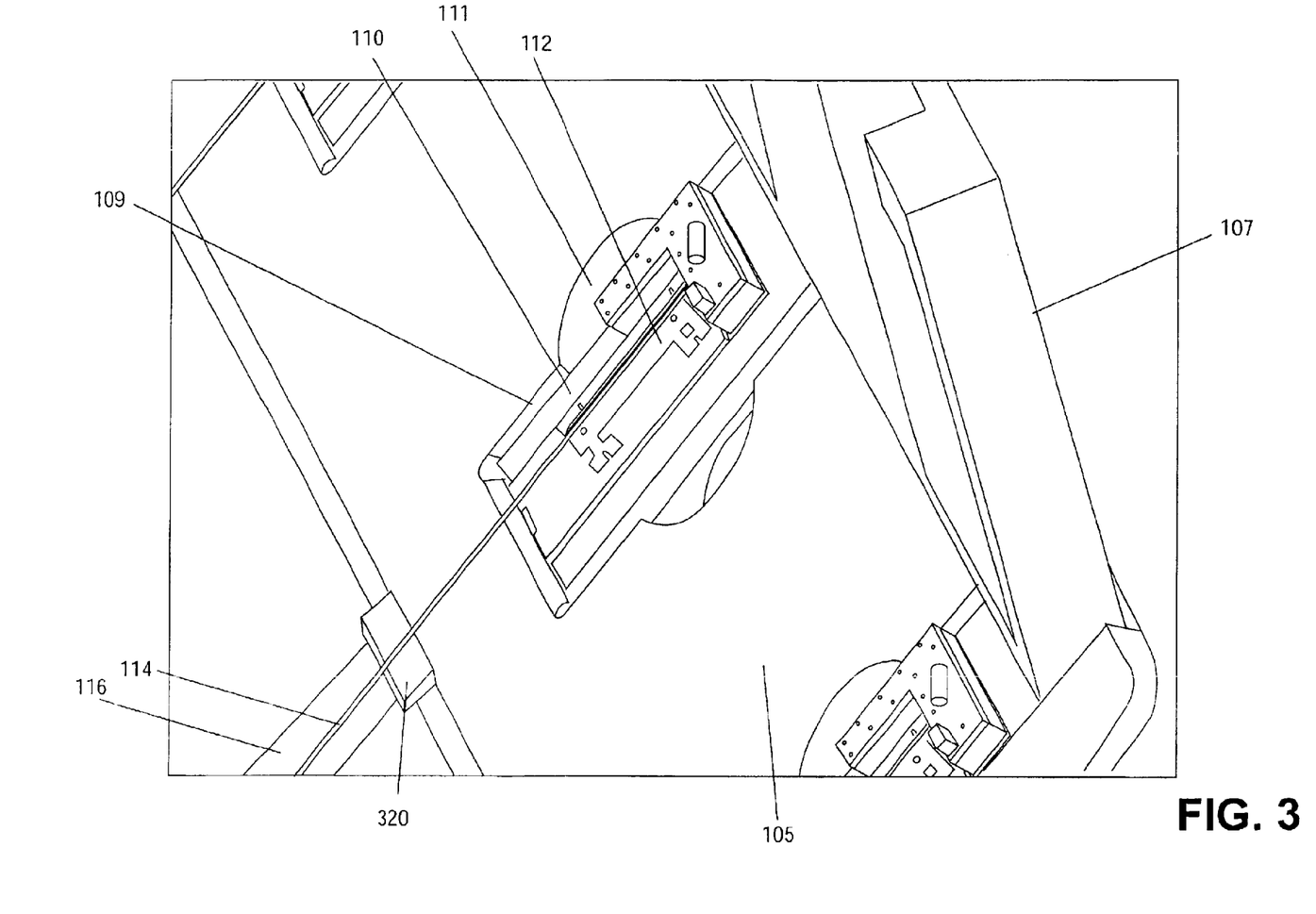
FIG. 3 shows an embodiment of the invention with a component on a tray body for insulating an optical fiber.

Referring to FIG. 1, an embodiment of the invention in the form of a fiber-flexure-substrate tray is shown. The fiber-flexure-substrate tray may have three main structures. First, a tray body 101 for supporting optical fibers, such as but not limited to optical fibers 113 and 114. Second, a thermally conductive substrate holder 105 for supporting substrates, such as substrate 110, coupled to the optical fibers 113 and 114. Third, a support area 118, as seen in FIG. 2, or component 320, as seen in FIG. 3, on the tray body 101 for thermally insulating the optical fibers 113 and 114 from the thermally conductive substrate holder 105.

Referring to FIG. 1, first, the fiber-flexure-substrate tray may have a tray body 101. The tray body 101 may have groove 115 for supporting the length of an optical fiber such as optical fibers 113 and 114. The tray body 101 may be made of a high temperature material including but not limited to a high temperature plastic such as UDEL Polysulfone®. Any material that will not substantially deform when exposed to heat from various processing stations may be used. For example, in one embodiment of the invention, a heat-treating temperature of at least 150° Celsius may be used to heat-treat a weld between a substrate 110 and a flexure 112 on the tray body 101 in one of the processing steps. The tray body 101 may be made from a material able to withstand 150° C., using any of several manufacturing processes including but not limited to, molding and injection die.

The tray body 101 may also have several other features useful for supporting and processing optical fibers 113 and 114. For example, inset 131 may be aligned with groove 115 to support a fiber clamp 117. The fiber clamp 117 may be coupled to the optical fiber such as optical fibers 113 and 114. The fiber clamp 117 may allow the optical fiber 113 to be handled without being pinched. The tray body 101 may have additional insets 133. To aid in alignment with a processing station, the tray body 101 may also have aligning holes 127 and 129 extending through the tray body 101. Other embodiments of the invention may not have aligning holes 127 and 129. In addition, other embodiments of invention may have additional aligning holes. The aligning holes 127 and 129 may be round. In addition, an aligning hole, such as aligning hole 127, may be oblong in at least one direction for alignment with a processing station.

The tray body 101 may also have side handle grooves 103 for gripping while the tray body 101 is being moved. A tray label 125 may be coupled to the tray body 101 to identify the entire tray body 101 and a fiber identification label 123 coupled to the tray body 101 for identifying each fiber-flexure-substrate on the tray body 101. In one embodiment, the long fiber identification label 123 may have individual identifications aligned with each optical fiber, such as optical fiber 113 and 114, on the tray body 101 to identify or give specific information related to each optical fibers 113 and 114. In another embodiment, a separate short label 123 may be used for each optical fiber 113 and 114 on the tray body 101. The tray label 125 may identify or give specific information related to all of the optical fibers, such as optical fibers 113 and 114 on the tray body 101. The tray body 101 may also have raised portions 119 and depressed portions 121 to aid in stacking with other tray bodies.

Second, the fiber-flexure-substrate tray may have a thermally conductive substrate holder 105 for supporting substrates, such as substrate 110. The thermally conductive substrate holder 105 may support the substrates 110 while transporting the substrates 110 and optical fibers 113 and 114 and while heating the substrates 110. In one embodiment of the invention, the substrate 110 coupled to the optical fiber, such as optical fibers 113 and 114, may be a silicon-based substrate with optical and electronic circuits for use in an optical module receiver or transmitter. Other substrates 110 are also within the scope of the invention. The thermally conductive substrate holder 105 may extend through the top and bottom of the tray body 101 to allow the substrate holder 105 to be heated from a heat source below the tray body 101. In addition, the substrate holder 105 may be a material that will not substantially deform at the temperatures used in the processing. The substrate holder material may be thermally conductive. For example, the substrate holder 105 may be made of stainless steel, aluminum, or copper. Other materials for the substrate holder 105 may also be within the scope of the invention.

The thermally conductive substrate holder 105 may have several other features useful for supporting and processing substrates, such as substrate 110, coupled to optical fibers 113 and 114. A shoulder screw 135 may be used to couple the substrate holder 105 to the tray body 101. The shoulder screw 135 may allow the substrate holder 105 to pivot relative to the tray body 101. In addition, a substrate holder cover 107 may also be coupled to the substrate holder 105 by, but not limited to, a hinge (not shown). A substrate holder cover 107 and shoulder screw 135 may also be made of a high temperature resistant material such as but not limited to stainless steel. In one embodiment of the invention, the substrate holder 105 may also have a hole 106 to allow a pin 108 from a processing station to extend through the substrate holder 105 and open the substrate holder cover 107 when needed. The substrate holder 105 may also have substrate insets 109 for supporting substrate 110. The substrate insets 109 may have side slots 111 for access to a side of the substrate to aid in retrieving and placing the substrate 110 in the substrate holder 105.

Third, the fiber-flexure-substrate tray may have a support area 218, seen in FIG. 2, or a component 320, seen in FIG. 3. Referring to FIG. 2, a support area 118 on the tray body 101 may insulate an optical fiber 114 from the thermally conductive substrate holder 105. For example, the support area 118 may be a part of the tray body 101 that holds the optical fibers, such as optical fibers 113 and 114 above the substrate holder 105. Other extensions of the tray body 101 for support areas 118 are also within the scope of the invention. Referring to FIG. 3 a component 320 may be coupled to said tray body to insulate an optical fiber 114 from the thermally conductive substrate holder 105. The component 320 may be a shape, such as but not limited to a prism, that may hold the optical fiber, such as optical fiber 114, above the thermally conductive substrate holder 105. The component 320 may be a material, such as but not limited to a high temperature plastic that may insulate the optical fiber, such as optical fiber 114, from the thermally conductive substrate holder 105. For example, in one embodiment of the invention, the component 320 may be made of UDEL Polysulfone®.

Figure 4:
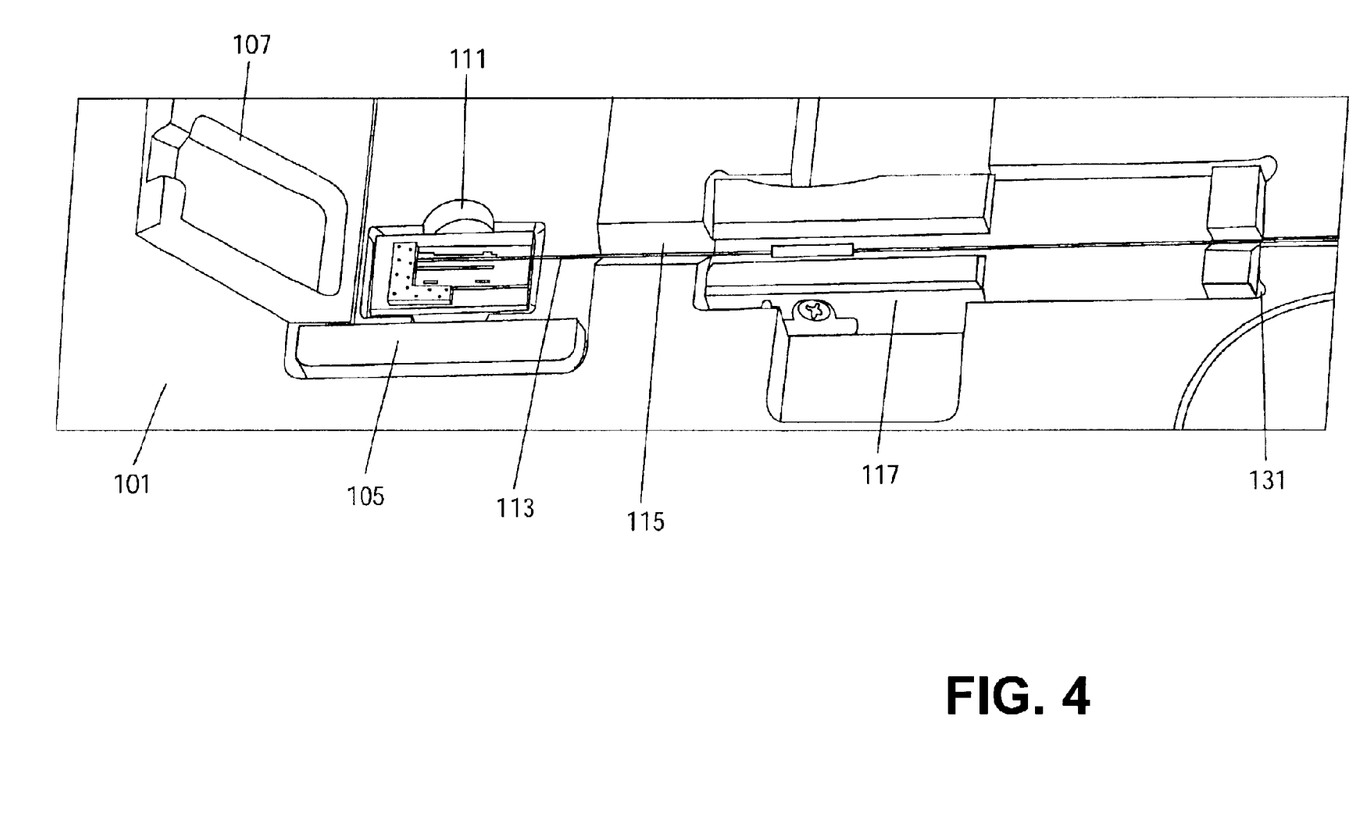
FIG. 4 shows a cut-out of an embodiment of the invention with a fiber clamp on a tray body.

Referring to FIG. 1, during a processing run, the optical fiber 114 may first have a flexure 112 coupled to its end without a substrate 110. The optical fiber 114 may be supported by the groove 116 in the tray body 101 as it is transported to a processing station to couple a substrate 110 to the flexure 112. A fiber clamp, similar to fiber clamp 117 (shown also in FIG. 4), may be coupled to the optical fiber 114 so that the optical fiber 114 may be handled without damaging the optical fiber 114. If the optical fiber 114 is handled directly, it may be scratched or pinched by processing equipment. A tray body 101 may hold any number of optical fiber 114/flexure 112 assemblies. The embodiment of the invention shown in FIG. 1 may support eight optical fiber/flexure assemblies.

After loading the optical fiber 114/flexure 112 assembly onto the tray body 101, the tray body 101 may be moved directly to a processing station for coupling a substrate 110 to the flexure 112 or may be stacked on other tray bodies using the raised portions 119 and depressed portions 121. While four raised portions 119 and four corresponding depressed portions 121 are shown on the embodiment of the invention in FIG. 1, any number of raised portions 119 and depressed portions 121, or their equivalents, may be used. The raised portions 119 and depressed portions 121 may also be used to hold the tray body 101 in place on a processing station. Typically, the raised portions 119 from a lower tray body 101 or processing station will fit into depressed portions 121 for a fit while stacking. While the raised portions 119 and depressed portions 121 are shown in a rounded triangular shape, other shapes may also be within the scope of the invention. Other ways of stacking tray bodies 101 including but not limited to ball/slot stacking and ridge/lip stacking may also be within the scope of the invention.

After coupling the substrate 110 to the optical fiber 114, the optical fiber 114/substrate 110 assembly may be returned to the tray body 101. The substrate 110 may be coupled to the substrate inlet 109 on the substrate holder 105. The substrate 110 may be coupled to the substrate inlet 109 by being placed inside the substrate inlet 109. The side slots 111 in the substrate inlet 109 may make it easier to place the substrate 110 into the substrate inlet 109 by allowing access to the sides of the substrate 110 while the substrate 110 is in the substrate inlet 109. After placing the optical fiber/substrate assemblies onto the tray body 101, the substrate holder cover 107 may be shut over the substrates in the substrate holder 105. The substrate holder cover 107 may keep the substrate 110 from coming out of the substrate inlet 109 while the tray body 101 is transported to the next processing station.

After the substrate 110 is coupled to the optical fiber 114 through flexure 112, the weld between the substrate 110 and the flexure 112 may need to be heat-treated to relieve stress which could lead to early fatigue and cracking in the weld. In another embodiment of the invention, the substrate 110 and the optical fiber 114 may be coupled without a weld. The tray body 101 may be placed onto the heat-treating station with the substrate holder 105 in thermal contact with a heat source. The heat source may be a hot plate that has a flat contact region for the bottom of substrate holder 105. In another embodiment of the invention, the heat source may be an oven to heat the substrate holder 105 part of the tray body 101 while the rest of the tray body 101 remains outside the oven. The aligning holes 127 and 129 may be used in conjunction with components on the heat-treating station to align the tray body 101 with the heat source. The shoulder screw 135 may allow the substrate holder 105 to pivot slightly to allow for a better thermal connection between the substrate holder 105 and the heat source. For example, in one embodiment of the invention, the shoulder screw 135 may allow the substrate holder 105 to pivot plus or minus two degrees. The optical fiber 114 may be insulated from the heat source by preventing contact between it and the substrate holder 105. For example, a component 320, as shown in FIG. 3, coupled to the tray body 101 may prevent contact between the optical fiber 114 and the heat source. Referring to FIG. 2, in another embodiment of the invention, the tray body 101 is extended at the end of the groove 116 to form a lip (not shown) to hold the optical fiber 114 above the surface of the substrate holder 105 to prevent thermal contact.

Figure 5:
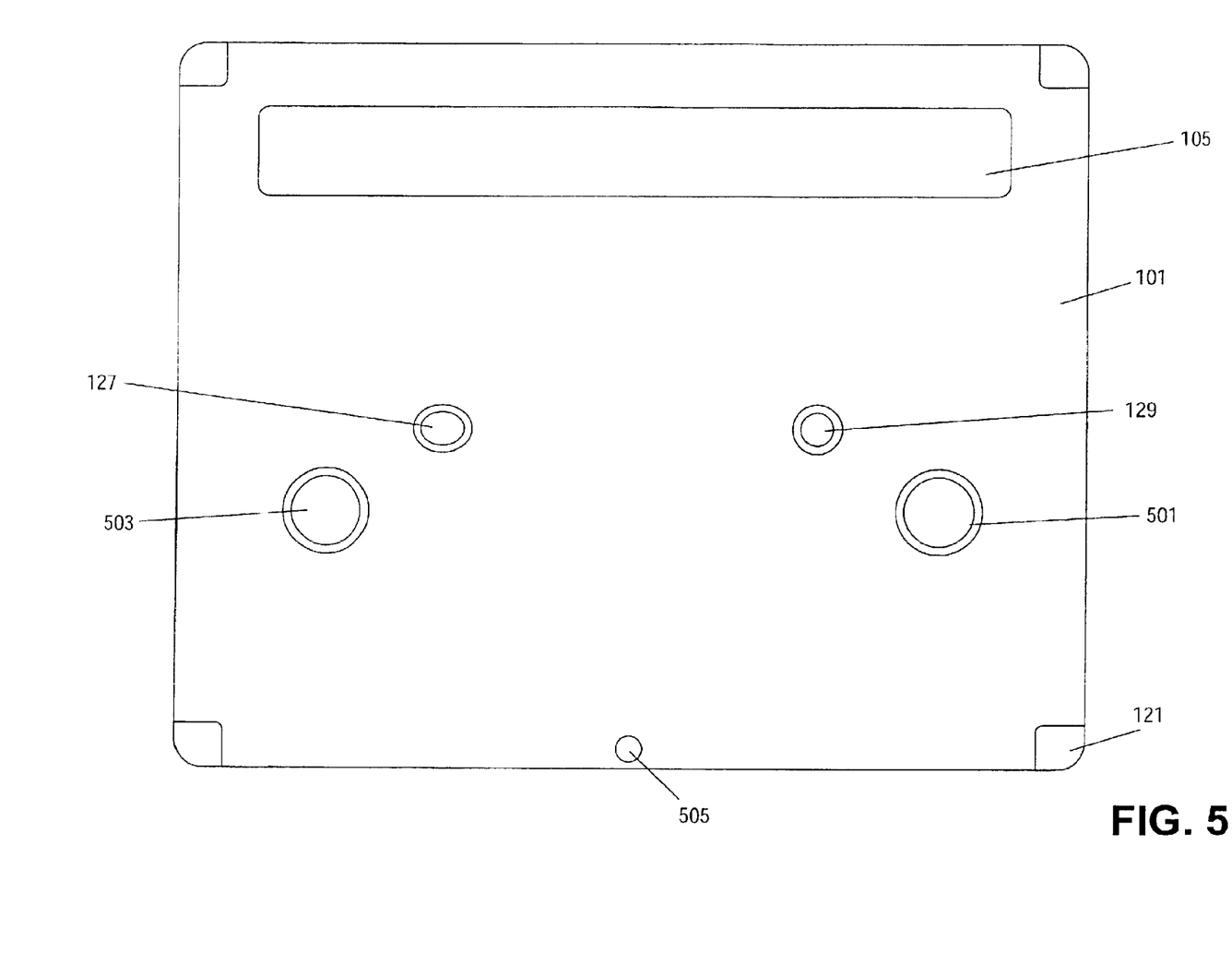
FIG. 5 shows a reverse view of an embodiment of the invention of the fiber-flexure-substrate tray.

Referring to FIG. 5, a reverse view of an embodiment of the invention of a fiber-flexure-substrate tray is shown. The bottom of a substrate holder 105 is shown extending through the bottom of a tray body 101. Label holes 501 and 503 may be near aligning holes 127 and 129, and may be used to remove a fiber identification label 123 (shown in FIG. 1). Press fit pin 505 may be coupled to the bottom of the tray body 101 or may be a part of tray body 101. Press fit pin 505 may be used to aid alignment of the tray body 101 and substrate holder 105 with an heat-treating station. The press fit pin 505 may keep the tray body 101 substantially level at a processing station while the bottom of the substrate holder 105 is in contact with a heat source. Depressed portions 121 in the bottom of tray body 101 may be used in stacking or holding the tray body 101.

Figure 6:
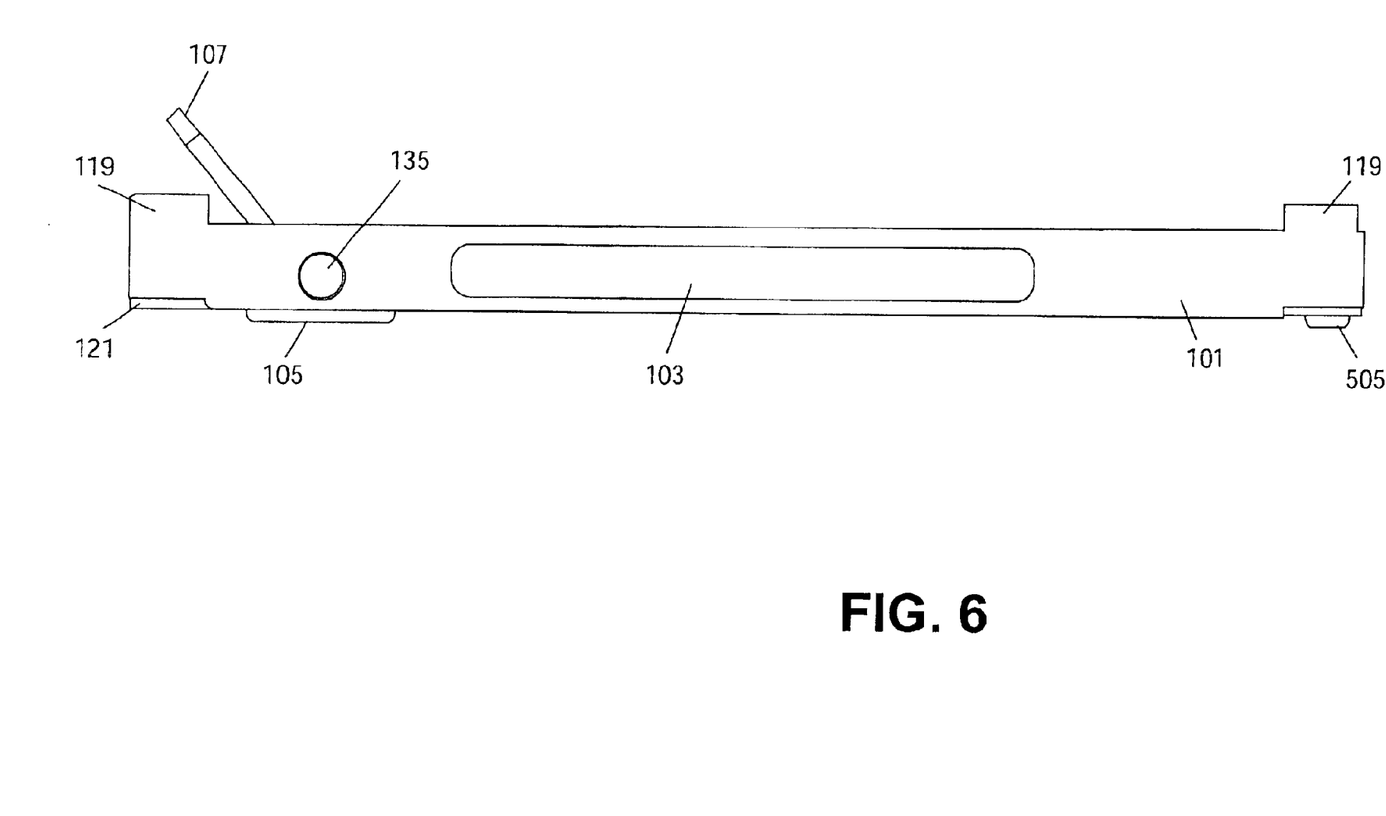
FIG. 6 shows a side view of an embodiment of the invention of the fiber-flexure-substrate tray.

Referring to FIG. 6, a side view of an embodiment of the invention of the fiber-flexure-substrate tray is shown. Press fit pin 505 may extend from the bottom of tray body 101 approximately the distance the bottom of the substrate holder 105 extends from the bottom of the tray body 101 to aid in aligning the tray body 101 and substrate holder 105 with a heat-treating station. A shoulder pin 135 may couple the substrate holder 105 to the tray body 101 and allow the substrate holder 105 to pivot to aid in alignment with an heat-treating station. Substrate cover 107 may be coupled to substrate holder 105 by a hinge (not shown) to allow it to open and close easily. Raised portions 119 and depressed portions 121 may be used to stack or hold the tray body 101. Side handle groove 103 may be used to grip the tray body 101 while transporting the tray body 101.

Figure 7:
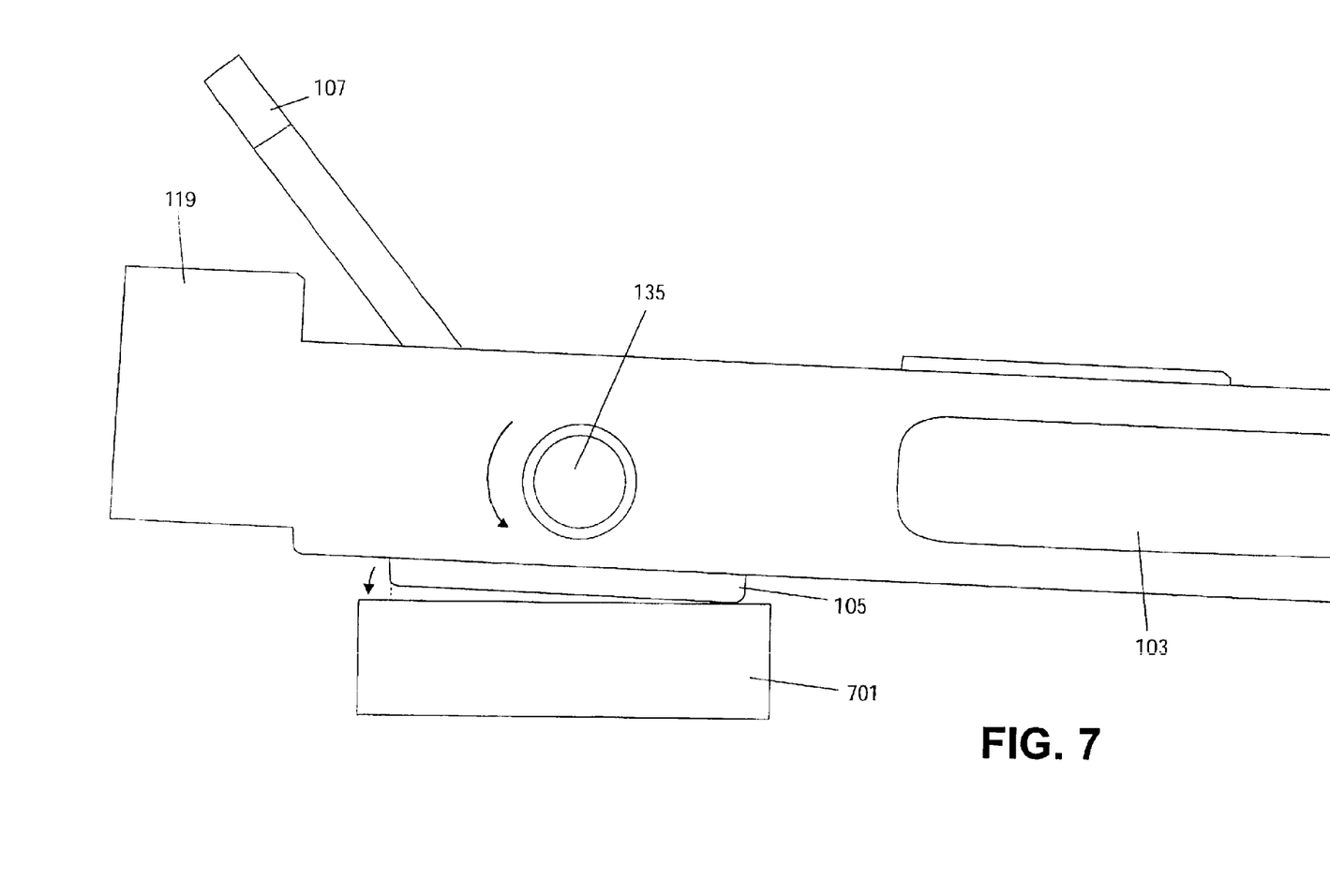
FIG. 7 shows a side view of an embodiment of the invention pivoting to align with a flat surface.

Referring to FIG. 7, a side view of an embodiment of the invention of the fiber-flexure-substrate tray is shown pivoting to align with a flat surface 701. The flat surface 701 may be a heating apparatus such as but not limited to a hot plate. Other types of flat surfaces 701 are also within the scope of the invention. The thermally conductive substrate holder 105 may pivot relative to the tray body 101 and flat surface 701 by a shoulder screw 135. Other screws and joints may also be within the scope of the invention.

Figure 8:
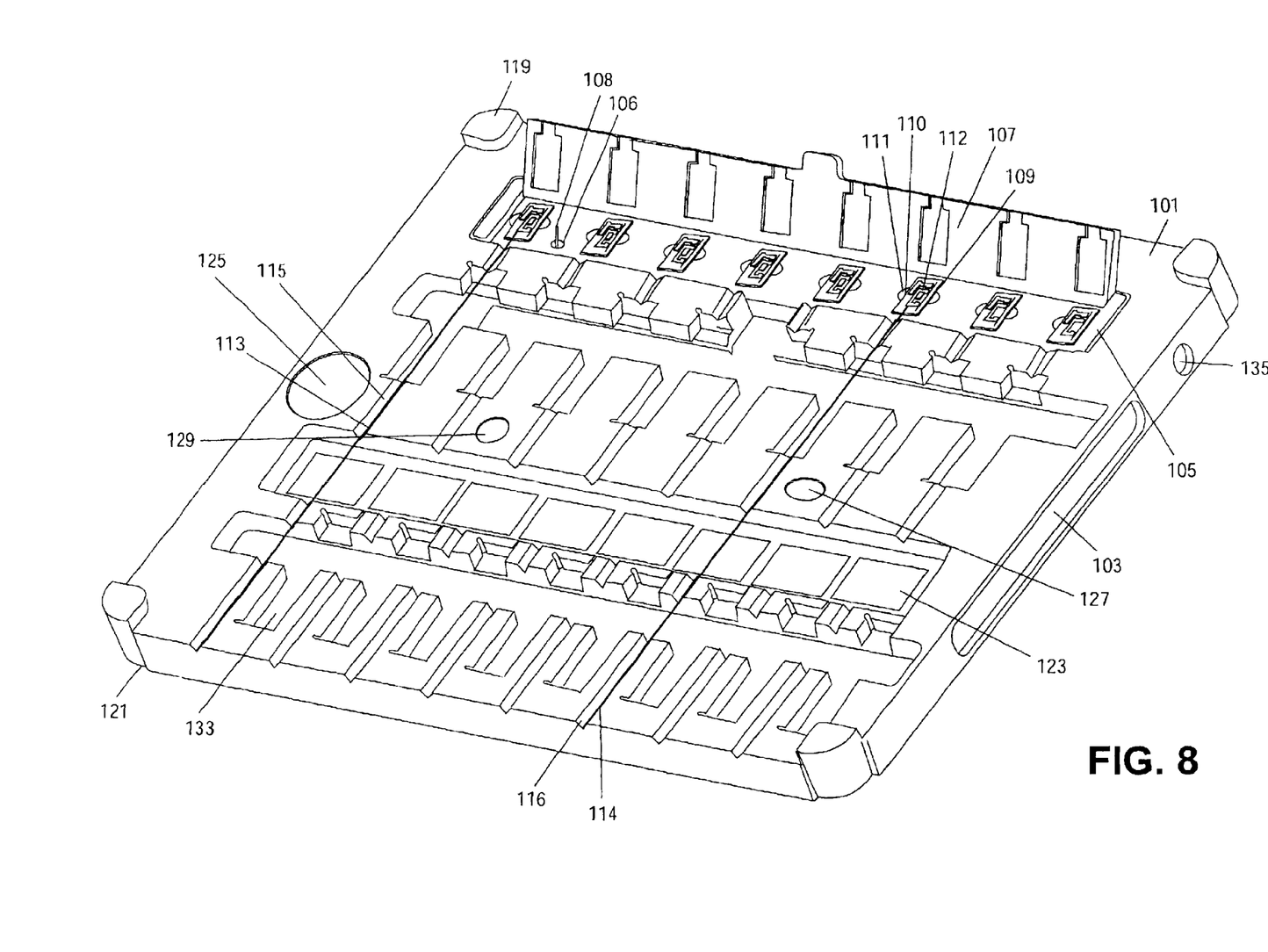
FIG. 8 shows an embodiment of the invention of the fiber-flexure-substrate tray without a fiber clamp.

Referring to FIG. 8, an embodiment of the invention of a fiber-flexure-substrate tray is shown without a fiber clamp. Optical fiber 114 and substrate 110 may be returned to a tray body 101 after the substrate 110 is aligned and coupled to the optical fiber 114 through a flexure 112 coupled to the end of the optical fiber 114. In one enbodiment of the invention, the fiber clamp may not be returned with the optical fiber 114 and substrate 110. In another embodiment of the invention, the fiber clamp may be returned to the tray body 101 and placed into additional inlet 133.

Figure 9:
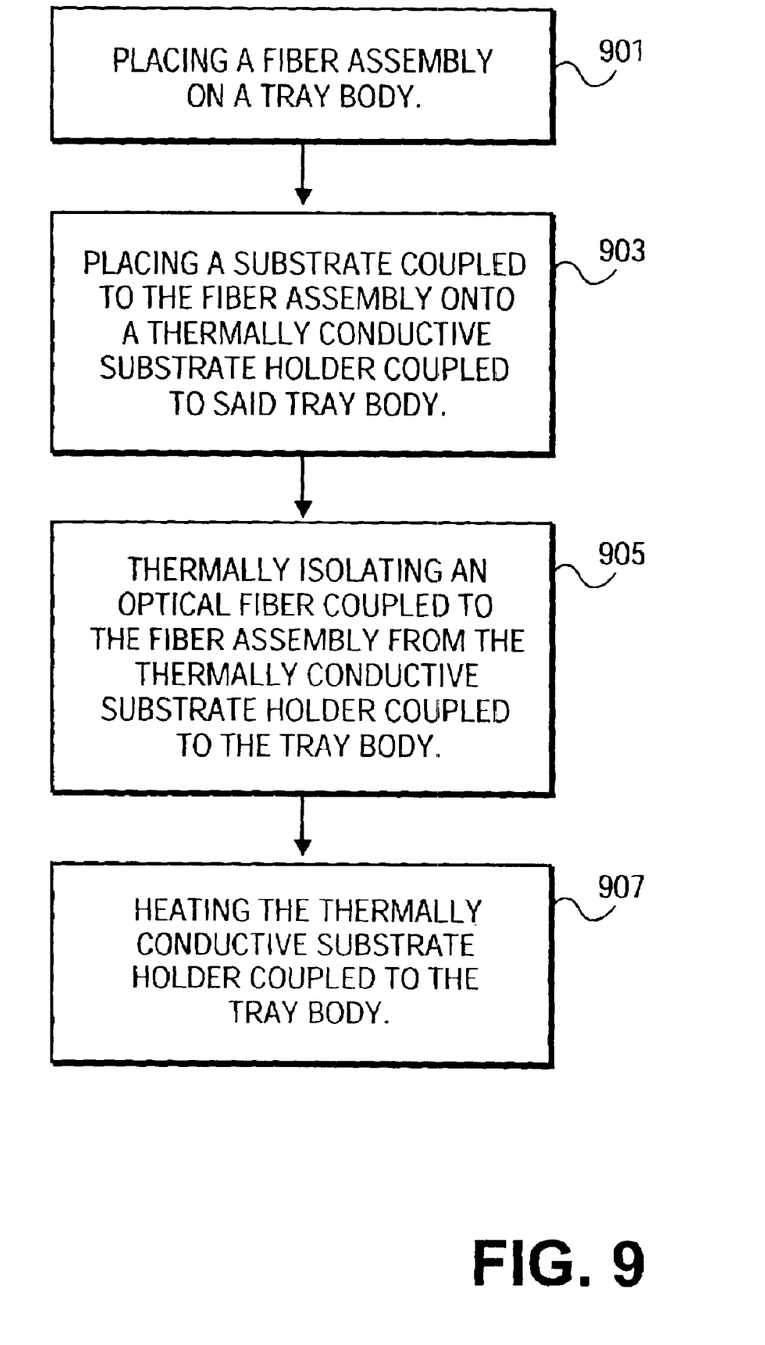
FIG. 9 shows an embodiment of the invention in the form of a flowchart for heat-treating a fiber assembly.

Referring to FIG. 9, an embodiment of the invention in the form of a flowchart for heating fiber assemblies is shown. A fiber assembly may be an optical fiber coupled to a flexure that is coupled to a substrate. Other fiber assemblies may also be within the scope of the invention. At block 901, a fiber assembly may be placed on a tray body. At block 903, a substrate coupled to the fiber assembly may be placed onto a thermally conductive substrate holder coupled to the tray body. At block 905, the optical fiber coupled to the fiber assembly may be thermally isolated from the thermally conductive substrate holder coupled to the tray body. The thermally conductive substrate holder coupled to the tray body may be aligned with the processing station by pivoting the thermally conductive substrate holder relative to the processing station. At block 907, the thermally conductive substrate holder coupled to the tray body may be heated. In addition, at a processing station, or between processing steps, the tray body may be stacked on another tray body.

Figure 10:
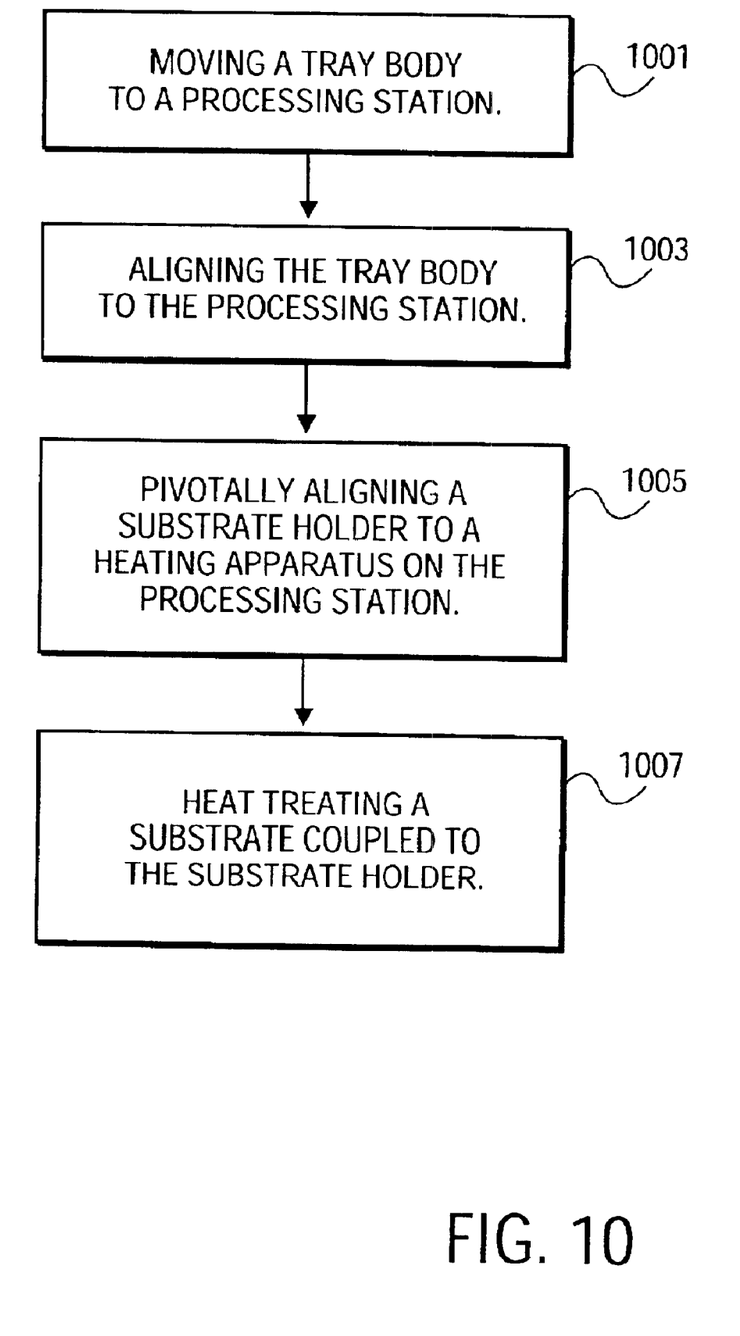
FIG. 10 shows an embodiment of the invention in the form of a flowchart for heat-treating substrates coupled to optical fibers.

Referring to FIG. 10, an embodiment of the invention in the form of a flowchart for heat-treating substrates coupled to optical fibers is shown. At block 1001, a tray body may be moved to a processing station. While waiting to be processed, the tray body may be stacked on other tray bodies. At block 1003, a tray body may be aligned to the processing station. For example, the aligning holes 127 and 129 (seen in FIG. 1) may be used to align the tray body to the processing station. At block 1005, a substrate holder may be pivotally aligned to a heating apparatus on the processing station. For example, a shoulder screw 135 coupling the substrate holder 105 to the tray body 101 (seen in FIG. 1) may allow the substrate holder 105 to pivot and lie flat on a heat source on the processing station. In addition, a press fit pin may hold the rest of the tray body substantially level and aligned at the processing station once the substrate holder has pivoted to align with the heat source. At block 1007, a substrate coupled to the substrate holder may be heat-treated. While the substrate coupled to the substrate holder is heat-treated, an optical fiber coupled to the substrate may be insulated from the substrate holder by a component coupled to the tray body.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

We claim:

1. A device comprising:
   a tray body to support an optical fiber; and
   a thermally conductive substrate holder coupled to said tray body to support a substrate coupled to said optical fiber, the substrate holder including a plurality of substrate inset depressions each to hold a substrate in a substantially fixed position without requiring bonding of the substrate to the substrate holder.

2. The device of claim 1, further comprising:
   a support area on said tray body to insulate said optical fiber from said thermally conductive substrate holder.

3. The device of claim 2 wherein said substrate holder extends through a top and a bottom of said tray body.

4. The device of claim 3 wherein said substrate holder is to pivot relative to said tray body.

5. The device of claim 2 wherein said tray body has a groove to support said optical fiber.

6. The device of claim 2 further comprising a substrate cover coupled to said thermally conductive substrate holder.

7. The device of claim 6 wherein said substrate holder includes a hole to open said substrate cover when a pin is subsequently inserted through said hole.

8. The device of claim 2 wherein said substrate holder includes stainless steel.

9. The device of claim 2 wherein said tray body includes a high temperature plastic.

10. The device of claim 2 wherein said tray body includes at least one aligning hole to align said tray body with a processing station.

11. The device of claim 2 further comprising a press-fit pin coupled to said tray body to keep said tray body substantially level at a processing station.

12. The device of claim 2 wherein said tray body includes an inset to hold a fiber clamp.

13. The device of claim 1, further comprising at least one side slot in each substrate inset depression to allow access to a side of a substrate in the substrate inset depression to aid in retrieving and placing the substrate in the substrate holder.

14. The device of claim 1, wherein the tray body comprises:
   a top side and a bottom side;
   at least one raised portion on the top side of the tray body, the raised portion having a shape; and
   at least one depressed portion of the bottom side of the tray body, the depressed portion having a shape compatible with the raised portion to allow the raised portion to be stacked on another substantially identical tray body.

15. The device of claim 1, the tray body further comprising a plurality of grooves, each groove to directly contact and support a length of an optical fiber without being fixedly attached to the optical fiber.

16. An apparatus comprising:
   a transfer tray body to support a plurality of optical fibers during transfer of the optical fibers and a plurality of substrates between processing steps of a plurality of assemblies, each assembly having at least one optical fiber of the plurality of optical fibers and at least one substrate of the plurality of substrates; and
   a thermally conductive substrate holder coupled to said tray body to support the plurality of substrates and to allow easy removal of the substrates from the substrate holder, wherein the substrates are not bonded to each other, to the substrate holder, or to the tray.

17. The apparatus of claim 16, further comprising:
   a component coupled to said tray body to insulate said optical fibers from said thermally conductive substrate holder.

18. The apparatus of claim 17 wherein said substrate holder is to pivot relative to said tray body.

19. The apparatus of claim 17 wherein said component includes high temperature plastic.

20. The apparatus of claim 16 further comprising a component coupled to said tray body to insulate at least one of said optical fibers from said thermally conductive substrate holder.

21. The apparatus of claim 16 further comprising a support area on said tray body to insulate at least one of said optical fibers from said thermally conductive substrate holder.

22. The apparatus of claim 16 further comprising a label coupled to said tray body to identify said optical fiber.

23. The apparatus of claim 16 further comprising a label coupled to said tray body to identify said tray body.

24. The apparatus of claim 16 further comprising a fiber clamp adapted to couple to at least one of said optical fibers and supported in said tray body.

25. A method comprising:
   placing a substrate coupled to a fiber assembly onto a thermally conductive substrate holder of a device that includes:
      a tray body to support an optical fiber; and
      the thermally conductive substrate holder coupled to said tray body to support a substrate coupled to said optical fiber, the substrate holder including a plurality of substrate inset depressions each to hold a substrate in a substantially fixed position without requiring bonding of the substrate to the substrate holder; and
   heating said thermally conductive substrate holder coupled to said tray body.

26. The method of claim 25 further comprising aligning said thermally conductive substrate holder to a processing station by pivoting said thermally conductive substrate holder relative to said processing station.

27. The method of claim 25 further comprising stacking said tray body on another tray body.

28. A method comprising:
   moving a device to a processing station, the device including:
      a transfer tray body to support a plurality of optical fibers during transfer of the optical fibers and a plurality of substrates between processing steps of a plurality of assemblies, each assembly having at least one optical fiber of the plurality of optical fibers and at least one substrate of the plurality of substrates; and
      a thermally conductive substrate holder coupled to said tray body to support the plurality of substrates and to allow easy removal of the substrates from the substrate holder, wherein the substrates are not bonded to each other, to the substrate holder, or to the tray;
   aligning said tray body to said processing station;
   pivotally aligning the substrate holder, coupled to said tray body, to a heating apparatus on said processing station; and
   heat-treating a substrate coupled to said substrate holder.

29. The method of claim 28 wherein heat-treating further comprises insulating an optical fiber from said substrate holder.

30. The method of claim 28 wherein pivotally aligning said substrate holder to said heating apparatus further comprises using a press-fit pin to align said tray body.

31. The method of claim 28 further comprising stacking said tray body on another tray body.

32. The method of claim 28 wherein aligning said tray body to said processing station further comprises using at least one aligning hole in said tray body.

* * * * *